US012438302B2

(12) United States Patent
Kropiewnicki

(10) Patent No.: US 12,438,302 B2
(45) Date of Patent: Oct. 7, 2025

(54) PLUG CONNECTOR INSERT AND METHOD FOR THE ASSEMBLY THEREOF

(71) Applicant: HARTING Electric Stiftung & Co. KG, Espelkamp (DE)

(72) Inventor: Norbert Kropiewnicki, Bielefeld (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 254 days.

(21) Appl. No.: 18/282,497

(22) PCT Filed: Mar. 16, 2022

(86) PCT No.: PCT/DE2022/100205
§ 371 (c)(1),
(2) Date: Sep. 15, 2023

(87) PCT Pub. No.: WO2022/214128
PCT Pub. Date: Oct. 13, 2022

(65) Prior Publication Data

US 2024/0154353 A1 May 9, 2024

(30) Foreign Application Priority Data

Apr. 7, 2021 (DE) ..................... 10 2021 108 600.0

(51) Int. Cl.

| | |
|---|---|
| ***H01R 13/514*** | (2006.01) |
| ***H01R 4/48*** | (2006.01) |
| ***H01R 13/629*** | (2006.01) |
| ***H01R 13/639*** | (2006.01) |
| ***H01R 13/645*** | (2006.01) |

(52) U.S. Cl.
CPC ......... *H01R 13/514* (2013.01); *H01R 4/4833* (2023.08); *H01R 13/629* (2013.01); *H01R 13/639* (2013.01); *H01R 13/645* (2013.01); *H01R 4/4821* (2023.08)

(58) Field of Classification Search
None
See application file for complete search history.

(56) References Cited

U.S. PATENT DOCUMENTS

| | | | | |
|---|---|---|---|---|
| 10,535,960 | B2 * | 1/2020 | Meier | H01R 13/7032 |
| 2010/0173531 | A1 | 7/2010 | Holste | |
| 2011/0104960 | A1 | 5/2011 | Feye-Hohmann | |
| 2014/0227914 | A1 | 8/2014 | Tedeschi | |

(Continued)

FOREIGN PATENT DOCUMENTS

| | | | |
|---|---|---|---|
| CN | 110299621 | 10/2019 | H01R 4/48 |
| DE | 102004062850 | 6/2006 | H01R 4/48 |
| DE | 102006014646 | 10/2007 | H01R 4/48 |

(Continued)

OTHER PUBLICATIONS

International Preliminary Report on Patentability issued in PCT/DE2022/100205, dated Oct. 10, 2023, 9 pages.

(Continued)

*Primary Examiner* — Tho D Ta
(74) *Attorney, Agent, or Firm* — HAYES SOLOWAY P.C.

(57) ABSTRACT

In order to facilitate the assembly of a plug connector insert with a contact carrier device, a contact carrier, a retaining plate and one or more actuators, an assembly latch for the pre-assembly of the actuators to the retaining plate is provided.

20 Claims, 5 Drawing Sheets

(56) References Cited

U.S. PATENT DOCUMENTS

Figure 1A:
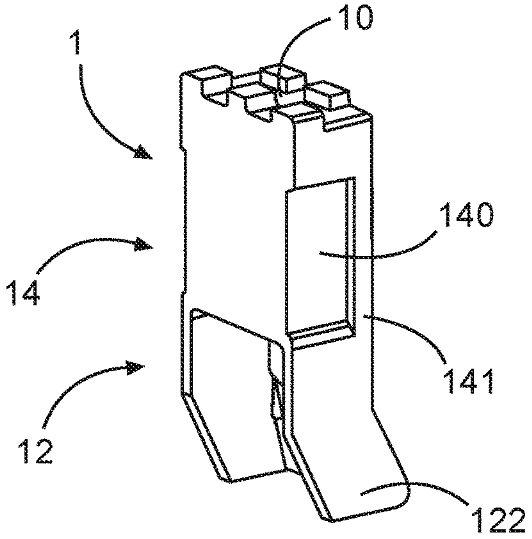
Figure 1B:
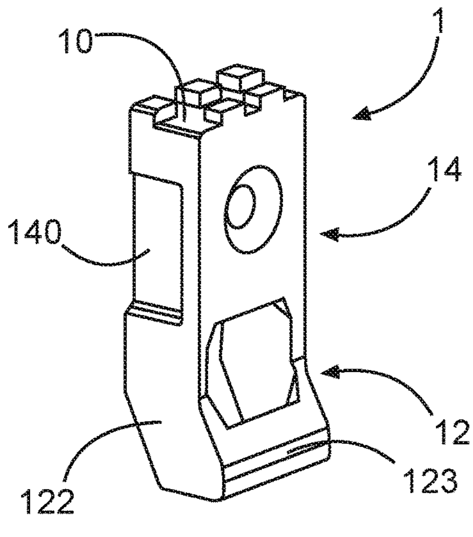
Figure 1C:
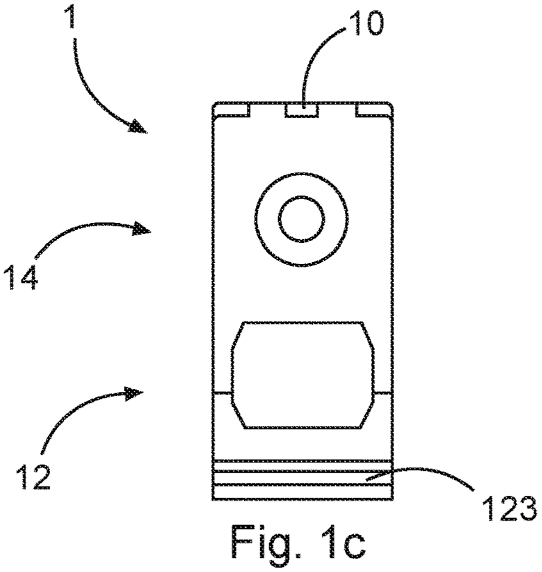
Figure 1D:
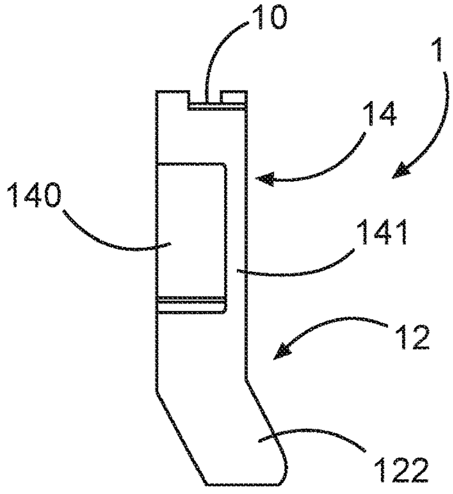
Figure 1E:
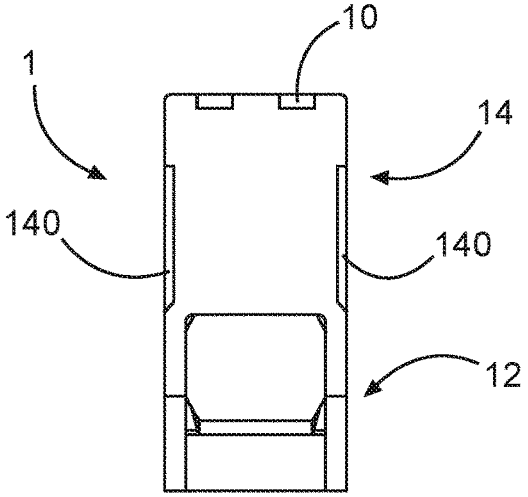
Figure 1F:
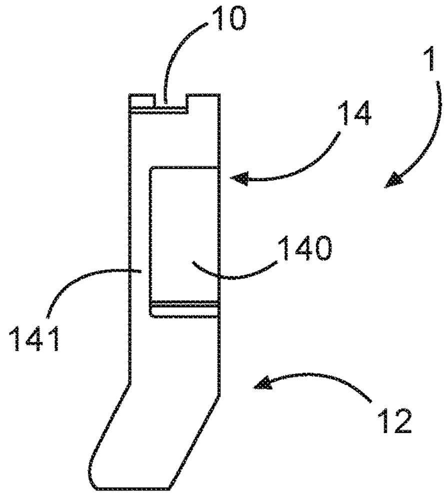

2019/0081433 A1* 3/2019 Kropiewnicki .... H01R 13/6658

FOREIGN PATENT DOCUMENTS

| | | | |
|---|---|---|---|
| DE | 102008032837 | 1/2010 | H01R 4/48 |
| DE | 202012103581 | 1/2013 | H01R 4/48 |
| EP | 3598582 | 1/2020 | H01R 4/48 |
| WO | WO2013168333 | 11/2013 | H01R 9/22 |
| WO | WO2016083966 | 6/2016 | H01R 4/48 |
| WO | WO2018004482 | 1/2018 | H01R 13/508 |
| WO | WO2018206048 | 11/2018 | H01R 13/74 |
| WO | WO2019175847 | 9/2019 | H01R 4/48 |

OTHER PUBLICATIONS

International Search Report and Written Opinion issued in PCT/DE2022/100205, dated Jun. 13, 2022, with English translation, 27 pages.

German Search Report issued in German Patent Appln. Serial No. 10 2021 108 600.0, dated Dec. 17, 2021, with English translation, 10 pages.

* cited by examiner

PLUG CONNECTOR INSERT AND METHOD FOR THE ASSEMBLY THEREOF

The invention is based on a plug connector insert according to the preamble of independent claim 1, having a contact carrier device and at least one plug contact with a clamping spring connection.

The invention is also based on a method for the assembly of the plug connector insert.

Such contact carrier devices are needed to accommodate contact units, in particular the aforementioned plug contact, and also to connect an electrical conductor, in particular a wire of an electrical cable, to the contact unit, i.e., to connect same electrically conductively to the contact unit and to retain/fix same mechanically thereon.

The plug connector insert can be suitable for being installed (i.e., "inserted") directly into a plug connector housing, for example a sleeve housing, attachment housing or socket housing. However, the plug connector insert can also be a so-called "plug connector module", which is arranged (i.e., "inserted") with other plug connector modules as part of a plug connector modular system together in a plug connector modular rack, wherein the plug connector modular rack can be fastened in a plug connector housing or to a wall opening. The other plug connector modules of the plug connector modular system can be combined in a customized manner for the use in question depending on the desired function, for example, for optical and/or electrical analog and/or digital signal transmission, electrical energy transmission, transmission of gases and pressure (pneumatics), or else for the purposes of measuring current, voltage and temperature and for evaluation and data processing purposes.

PRIOR ART

Document WO 2018/004482 A1 discloses a connector suitable for use in industrial applications. It comprises, at one end, a terminal block, which accommodates stripped wires and connects each of them to a respective pin contact or socket contact by means of a lever-actuated spring contact. These pin/socket contacts are part of a plug or plug forming the other end of the plug. The connector also comprises a housing consisting of a base and a cover. The base comprises the pin/socket contacts and accommodates the spring contacts. The levers are fixed, in particular by their pivot pin, between the base and the cover of the plug.

This prior art is disadvantageous owing to the undesirably high assembly effort and the associated difficulties in automated production.

The German Patent and Trade Mark Office has searched the following prior art in the priority application for the present application:

DE 10 2004 062 850 B3, WO 2016/083966 A1, WO 2019/175847 A1, DE 10 2006 014 646 B4, DE 10 2008 032 837 A1 and

WO 2018/004482 A1.

OBJECT

The object of the invention consists in specifying a plug connector insert having a contact carrier device that overcomes these difficulties and can be assembled with the least possible effort, in particular also in an automated manner.

The object is achieved by the subject matter of the independent claims.

The contact carrier device has a contact carrier with a cable connection side, a connection region on the cable connection side, and at least one contact chamber that is open on the cable connection side for accommodating a contact unit. Furthermore, the contact carrier device has a retaining plate, which can be connected to and fixed, in particular snap-fitted, on the contact carrier on the cable connection side and has, for each contact chamber, an actuation opening and a connection opening adjacent thereto for inserting an electrical conductor into the contact chamber. Moreover, the contact carrier device has, at each actuation opening, an actuator, which is arranged or is to be arranged at least partially in the corresponding contact chamber for disconnecting the electrical conductor from the contact unit.

According to the invention, the retaining plate and the at least one actuator have a common assembly catch for preassembling the actuator on the retaining plate.

Advantageous embodiments of the invention are specified in the dependent claims and in the description below.

The invention has the advantage that the assembly, in particular the automated assembly, of the contact carrier device is made much simpler. This is useful in particular when the contact carrier device has a relatively large number of contact chambers and actuators, for example four or more contact chambers and actuators. For example, the contact carrier device can have at least six, preferably at least eight, and particularly preferably at least ten, in particular at least twelve contact chambers, and thus also a corresponding number of connection openings, actuation openings and actuators.

Then the actuator(s) can initially be preassembled on the retaining plate in a first assembly step. To this end, each actuator can first be inserted into the retaining plate from the plug-in side direction. In the process, each actuator can snap-fit on the associated assembly catch and is then prevented from falling out of the retaining plate on the plug-in side by the assembly catch.

In a second assembly step, a.) the retaining plate can be joined to the contact carrier on the connection side, and at the same time b.) all the actuators can be inserted into the respective contact chambers. After subsequent snap-fitting of the retaining plate on the contact carrier, the actuators are retained captively in their respective contact chambers. In the plug-in side direction, their freedom of movement is limited by the contact carrier and/or the contact unit accommodated therein. In the cable connection side direction, their freedom of movement is limited by the retaining plate.

It is particularly advantageous that the assembly catch is dimensioned such that it does not limit this freedom of movement of the actuator, which is necessary for actuation. The actuator can then change from its actuated position to its non-actuated position and vice versa from its non-actuated position to its actuated position without undergoing a snap-fit or detachment of the assembly catch. This can be achieved in particular by means of the length of at least one, preferably multiple, in particular two snap-in recesses that are arranged laterally on the actuator and are described in detail below by way of example.

In other words, the actuator can thus be transferred from a non-actuated position to an actuated position in order to disconnect the electrical conductor without a snap-fit or detachment of the assembly catch taking place as a result.

In an advantageous embodiment, the assembly catch consists in said at least one lateral snap-in recess in the actuator on one side and at least one snap-in molding, which can be accommodated form-fittingly in the snap-in recess, on the retaining plate on the other side. In this case, lateral means that the at least one snap-in recess is arranged in at least one side wall of the actuator, wherein the at least one side wall connects an application face, which is used for actuation by means of a tool (for example, a slot screwdriver), on the cable connection side of the actuator to an actuation section of the actuator in the plug-in direction and thus in the movement direction of the actuator, wherein the actuation section is provided for interaction with the contact unit for disconnection of the electrical conductor from the contact unit.

In particular, the actuator has an in particular cuboid retaining section with said side wall, wherein the snap-in recesses can be arranged in the retaining section on the outside, in particular on two mutually opposing, in particular parallel side walls, preferably in two short side walls.

Adjacently to the retaining section on the plug-in side, the actuator can have the actuation section for interaction with the contact unit, in particular with a clamping spring of the contact unit, as mentioned above. Preferably, this actuation section can have two mutually opposing actuation arms, which are connected to one another at the ends via a bar to actuate the clamping spring, in particular a clamping limb of the clamping spring.

The retaining plate has a baseplate. Two mutually opposing parallel guide strips running in the plug-in side direction are molded to the baseplate at each fastening opening. Said guide strips can consist in flat guide walls, for example. The snap-in moldings can preferably be arranged on the inside of these guide strips, i.e., directed toward one another. In particular, the snap-in moldings can be snap-in moldings that taper in the plug-in side direction and thus conversely get thicker in the direction of the cable connection side, which is particularly advantageous because this considerably simplifies the mentioned preassembly of the actuator to be inserted from the plug-in side direction between the guide strips and to be snap-fitted thereon.

When the contact carrier device is in the assembled state, the actuator can advantageously be arranged "countersunk" into the contact carrier and/or at least terminate flush therewith, i.e., it does not protrude out of the retaining plate on the cable connection side. This is particularly advantageous because unintended actuation and in particular an associated unintended disconnection of the electrical conductor is thus avoided. For its part, the actuator can be actuated for example with the mentioned tool, for example a screwdriver, pin or similar.

To snap-fit the retaining plate on the contact carrier, the retaining plate can have multiple snap-in tabs, which point in the plug-in direction, fit around the contact carrier on both sides, and snap-fit on outer walls of the contact carrier. To this end, the snap-in tabs can have snap-in windows, and snap-in hooks can be molded on the outer walls of the contact carrier and engage snap-fittingly in the snap-in windows in the assembled state.

The plug connector insert has the aforementioned contact carrier device and at least one contact unit, which is arranged at least partially in the at least one contact chamber of the contact carrier.

The contact unit can have a conductor bar, which in particular has a peripheral cage, which can be formed for example by a punched and bent part that is bent at right angles multiple times and closed at its ends, for example by a dovetail connection, and can consist in particular of sheet metal. The cage can be open on the cable connection side in order to allow the insertion of the electrical conductor and the actuation section of the actuator.

At least partially arranged in the interior of this cage there can be a separate, substantially V-shaped clamping spring, which consists in particular of resilient sheet steel. The clamping spring can also have a clamping limb and a retaining limb, which are connected to one another via a curved spring bend. The spring bend of the clamping spring can protrude out of the cage on the cable connection side. Preferably, the retaining limb can be fastened inside the cage from the inside or from the outside to a first cage wall and press with the second clamping limb against a second cage wall opposite the first cage wall. The fastening of the retaining limb to the first cage wall can consist for example in a riveted, screwed, soldered, welded and/or stamped connection. Alternatively or additionally, the fastening can also consist in a snap fit and/or at least in a form fit.

It is particularly preferred when the clamping spring has a fastening window in its retaining limb. The first cage wall can have a protrusion or a tab, which is preferably punched out of the cage wall and protrudes into the interior of the cage. The contact spring can then fit with its window around the protrusion/tab and thus be retained thereon at least in the plane of the first side wall and in particular in the plug-in direction. In addition to this, the clamping limb can advantageously apply a sufficient force perpendicularly to the plug-in direction to press the retaining limb against the first cage wall and thus to retain the clamping spring reliably in the cage.

The clamping limb of the clamping spring can press from the inside against a second cage wall opposite the first cage wall. The electrical conductor can then be inserted into the cage from the cable connection side direction and clamped between the clamping limb, which pivots in the plug-in side direction as a result, and the second cage wall in order to be connected to the contact unit, i.e., electrically conductively connected thereto and mechanically fixed thereon, at least in the movement direction toward the cable connection side.

The conductor bar can have a connection section on the plug-in side. Said connection section can consist for example in a section of the metal sheet angled at right angles to the plug-in direction and can in particular have a through-hole. A plug contact can thus be for example screwed, soldered, welded, press-fitted or particularly preferably riveted thereto. The plug contact can for example be a pin contact or a socket contact.

The contact carrier is preferably formed integrally from plastic, for example using an injection-molding process, and can have a plug-in region on the plug-in side of its retaining section. In the plug-in region, there is, for each contact chamber and adjoining same, an in particular cylindrical through-opening running in the plug-in direction. The contact unit can then be arranged with its clamping cage in the contact chamber and with its plug contact in the through-opening of the contact carrier in order to ensure the basic function of a plug connector, specifically producing the electrical connection to a cable on the connection side and the electrical connection to plug contacts of a mating connector on the plug-in side.

To form a plug connector in the traditional sense, the contact carrier device can be installed in a plug connector housing. Alternatively or additionally, the contact carrier device can be a plug connector module for the plug connector modular system mentioned in the introduction and in particular be suitable for being accommodated in the mentioned plug connector modular rack. To this end, the contact carrier device can be substantially cuboid at least in some sections in its outer contour and have snap-in noses on its mutually opposing short side faces for accommodation in snap-in windows of the plug connector modular rack. For example, the contact carrier can have a substantially cuboid connection region, on the short sides of which the snap-in noses are molded and are directed outward, i.e., away from one another. In particular, the two snap-in noses and the corresponding windows of the plug connector modular rack can differ in shape, for example in width, in order to ensure correct polarization of the plug connector module in the plug connector modular rack.

An in particular automated method for the assembly of the plug connector insert provides at least the following steps:

A. inserting the contact unit into the contact carrier from the cable connection side direction, and joining the at least one actuator to the retaining plate from the plug-in side direction, and snap-fitting the actuator by means of the assembly catch on the retaining plate by means of the assembly catch;

B. joining the retaining plate to the contact carrier and at the same time inserting the at least one actuator into the at least one contact chamber of the contact carrier.

In an advantageous embodiment, the following step can be added to this method:

C. fixing the retaining plate on the contact carrier, for example by snap-fitting.

It is particularly advantageous for time-saving reasons that in method step A. the insertion of the contact unit into the contact carrier from the cable connection side direction, and the joining of the at least one actuator to the retaining plate from the plug-in side direction, and the snap-fitting of the actuator on the retaining plate by means of the assembly catch, can be carried out simultaneously.

EXEMPLARY EMBODIMENT

Figure 2A:
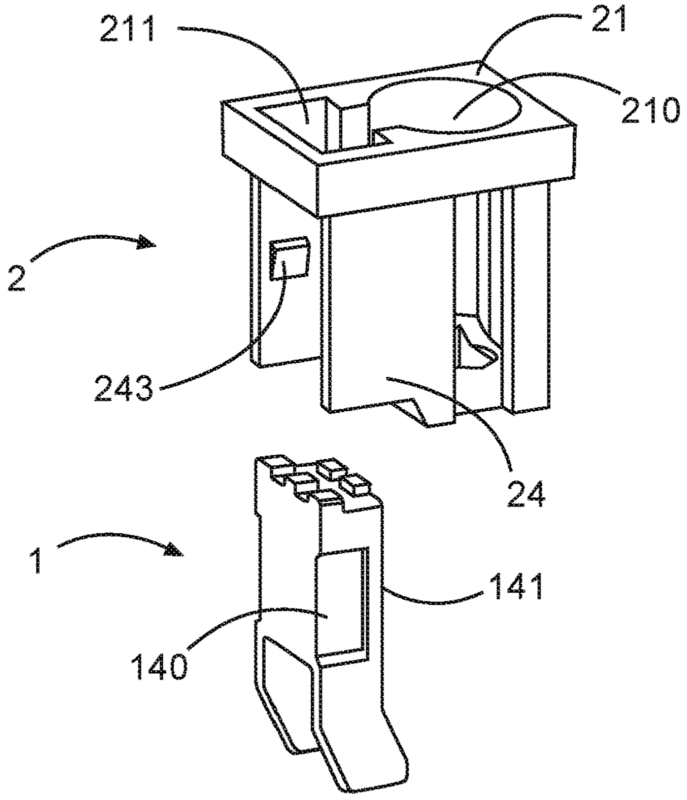

An exemplary embodiment of the invention is shown in the drawings and explained in more detail below. In the figures, FIGS. 1*a-f* show different views of an actuator;

FIG. 2*a* shows the actuator with a retaining plate separately, and

Figure 2B:
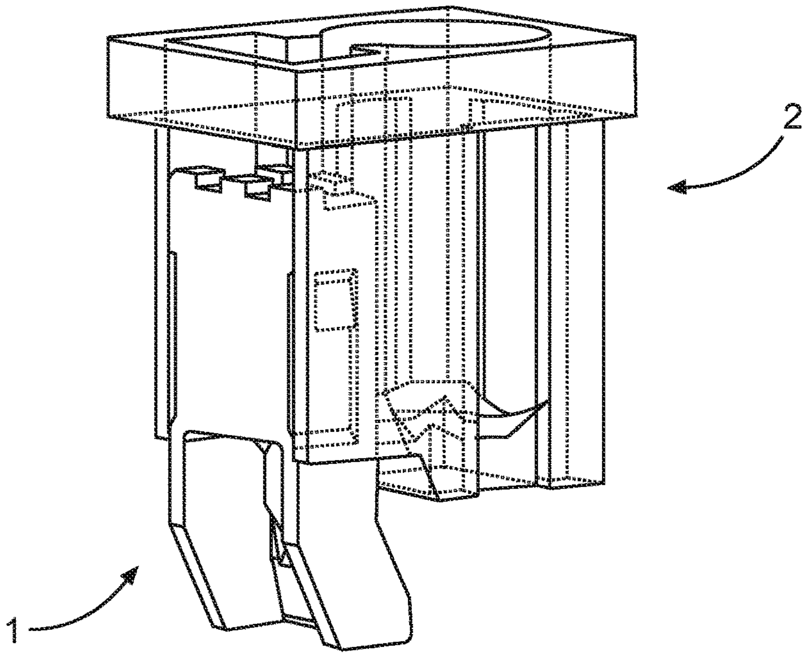
Figure 4A:
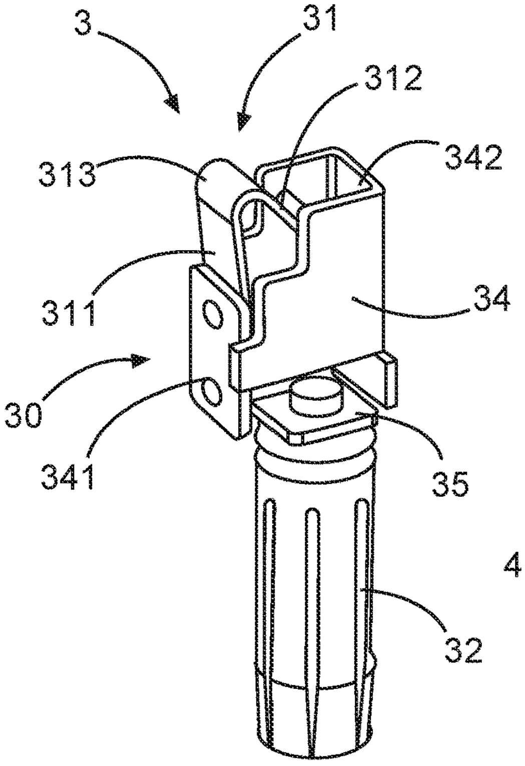
Figure 4B:
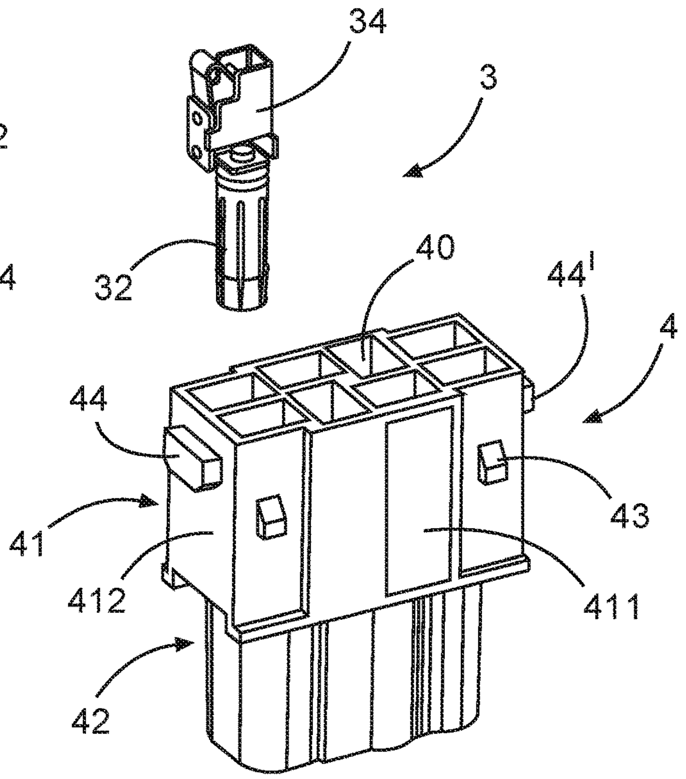
Figure 4C:
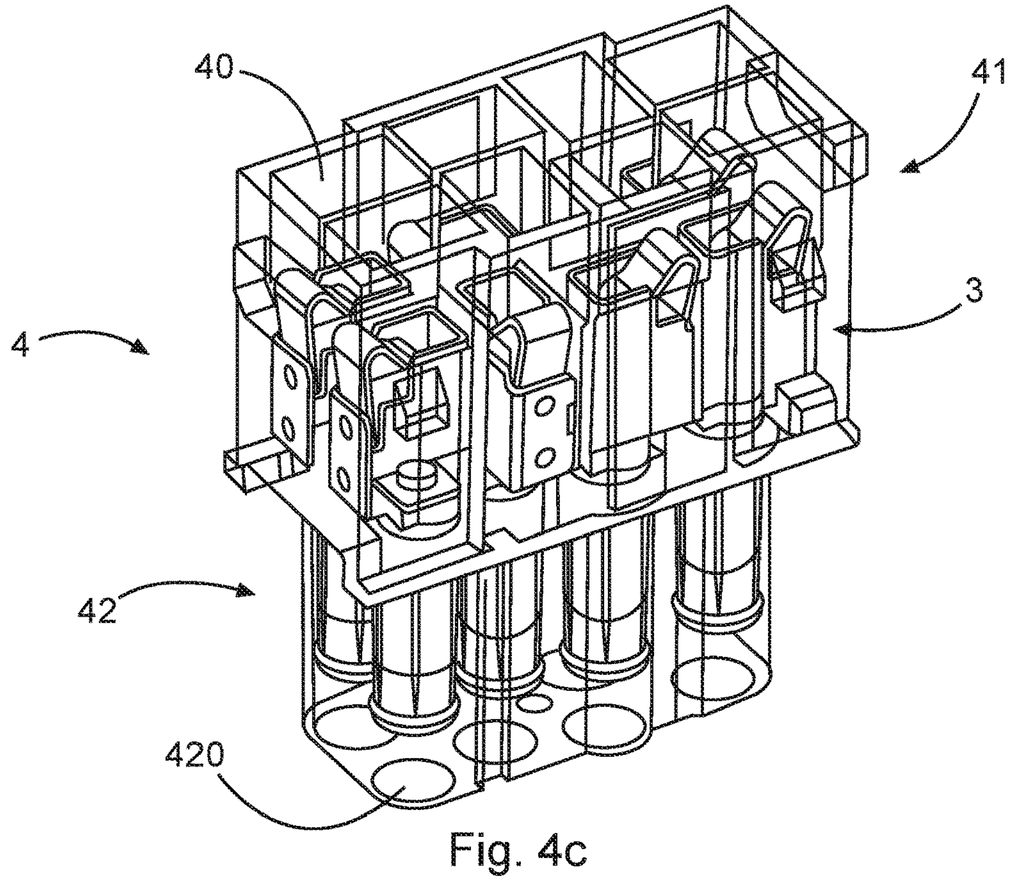
Figure 5A:
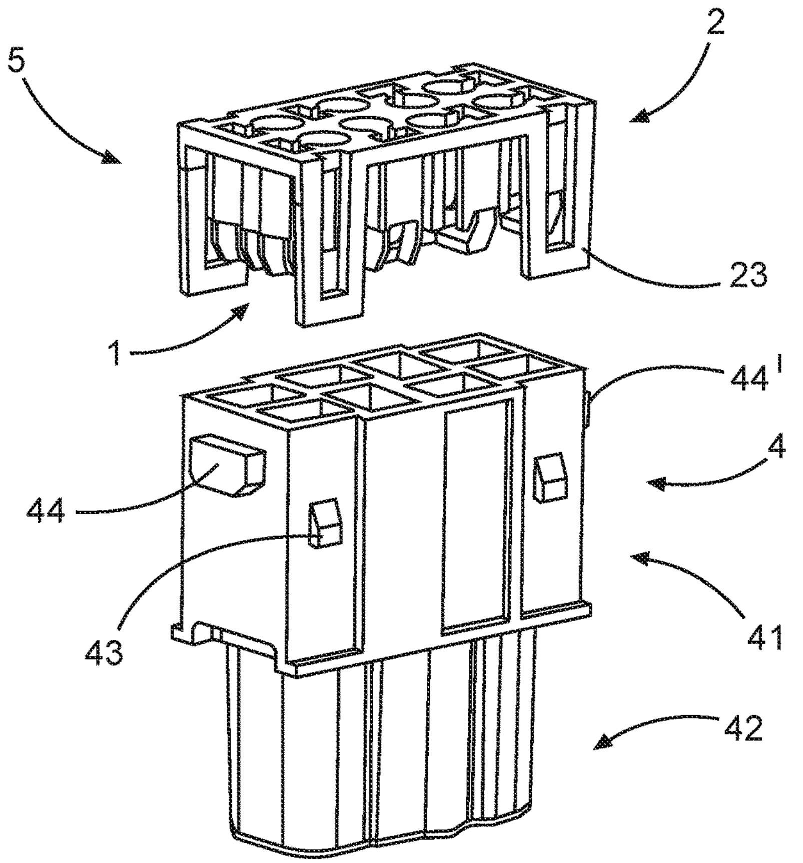
Figure 5B:
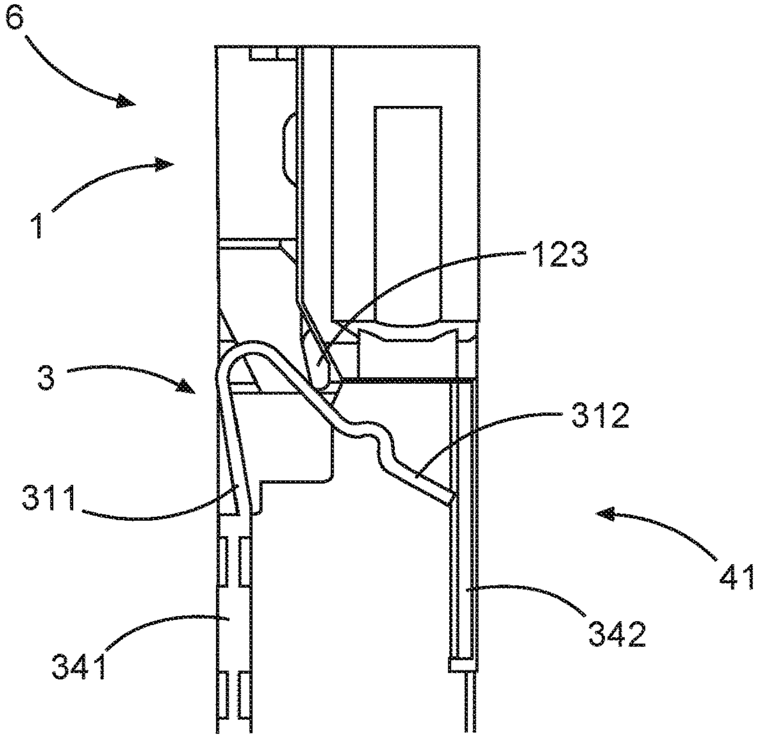

FIG. 2*b* shows a preassembled arrangement of the actuator and the retaining plate;

FIGS. 3*a-d* show the preassembled arrangement from different viewing angles and in different actuation states;

FIG. 4*a* shows a contact unit;

FIG. 4*b* shows the contact unit with a contact carrier separately;

FIG. 4*c* shows the contact carrier, shown transparently, with the contact unit inserted into a contact chamber;

FIG. 5*a* shows a plug connector insert in the preassembled state;

FIG. 5*b* shows a cross-sectional diagram of a contact carrier device with the clamping spring in the assembled state.

The figures contain in some cases simplified, schematic representations. Identical reference signs are sometimes used for like but possibly non-identical elements. Different views of like elements might be scaled differently.

In all the drawings, the position of the components shown is selected such that the term "cable connection side" means the top of the drawing and the term "plug-in side" means the bottom of the drawing, in relation to the assembled arrangement of the components. Accordingly, the "plug-in direction" runs from top to bottom in the drawing.

FIGS. 1*a-f* show different views of an actuator 1. The actuator 1 has a cuboid retaining section 14, which has, on the cable connection side end, an application face 10, for example for applying a slot screwdriver or similar. On the outside, specifically on two mutually opposing short side walls, elongate snap-in recesses 140 running in the plug-in direction are arranged on the retaining section 14 and are delimited on one side by a fixing strip 141. The fixing strip 141 has the effect that the actuator 1 can be or is already retained particularly securely on a retaining plate 2 shown below when in the preassembled state.

Adjacently to the retaining section 14 on the plug-in side, the actuator 1 has an actuation section 12 for interaction with a contact unit 3 shown below, and in particular for interaction with a clamping spring 31 of the contact unit 3, said clamping spring being described in more detail below (cf. FIG. 4*a*). The actuation section 12 has two mutually opposing actuation arms 122, which are connected to one another at the ends via a bar 123 to actuate the clamping spring 31, in particular a clamping limb 312 of the clamping spring 31.

FIGS. 2*a* and 2*b* show the actuator 1 together with a detail of the retaining plate 2 in the separated (FIG. 2*a*) and in the snap-fitted (FIG. 2*b*) states. The complete retaining plate 2 is shown below, for example in FIG. 5*a*.

The retaining plate 2 has a baseplate 21, which is horizontal in the drawing and has two openings arranged in the detail shown, specifically a circular connection opening 210 and a rectangular actuation opening 211 adjacent thereto.

On both sides of the actuation opening 211, two mutually opposing parallel guide strips 24, which run in the plug-in side direction and are flat guide walls, are molded on the baseplate 21. On the inside, the guide strips 24 each have snap-in moldings 243, which are directed toward one another.

The snap-in moldings 243 taper in the plug-in direction, that is, downward in the drawing. Conversely, the snap-in moldings 243 get thicker in the direction toward the cable connection side, that is, upward in the drawing. This is particularly advantageous because it simplifies preassembly of the actuator 1 to be inserted from the plug-in side direction between the guide strips 24 and snap-fitted thereon. In FIG. 2*a*, the actuator 1 is shown on the cable connection side of the retaining plate 2, that is, below same in the drawing, i.e., in the position from which said actuator is preassembled on the retaining plate 2.

It can be easily envisaged that the actuator 1 can be pushed from this position shown, between the guide strips 24 in the direction of the baseplate 21 and thus joined to the retaining plate 2 and preassembled on the snap-in moldings 243 of the retaining plate 2 by snap-fitting of its snap-in recesses 140 and thus retained thereon movably in the plug-in direction, at least via the actuation region of the actuator.

FIG. 2*b* shows the actuator 1 with the retaining plate 2 shown transparently, in the state thus preassembled. The snap-in hook 243 butts against the upper edge of the snap-in recess 140. This prevents the actuator 1 from becoming disconnected from the retaining plate 2 and falling out in the plug-in direction, i.e., downward in the drawing. Moreover, the fixing strip 141, coming from the right in the drawing, butts against the snap-in hook 243 and prevents the actuator 1 from falling out laterally (to the left in the drawing).

Figure 3A:
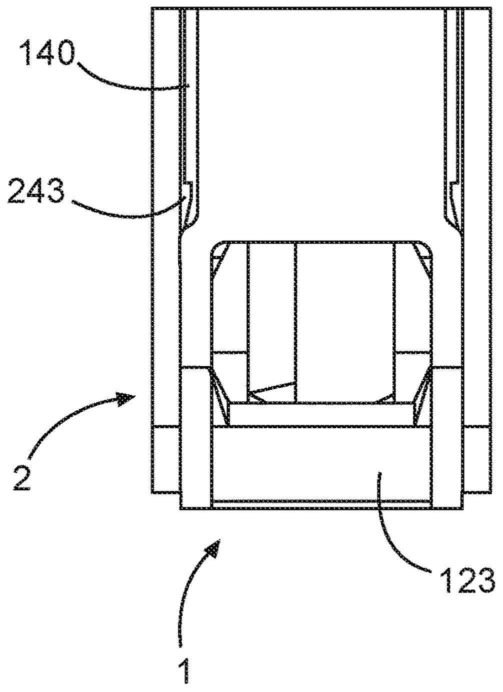
Figure 3B:
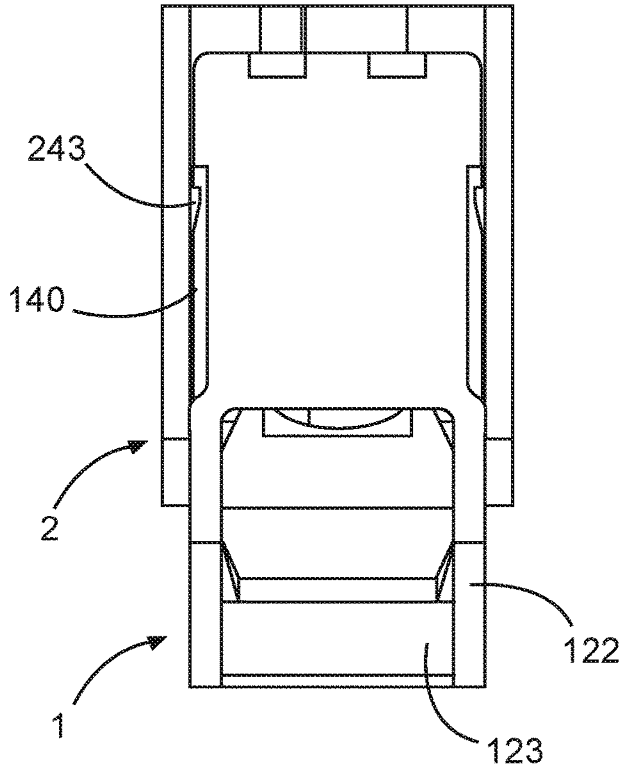
Figure 3C:
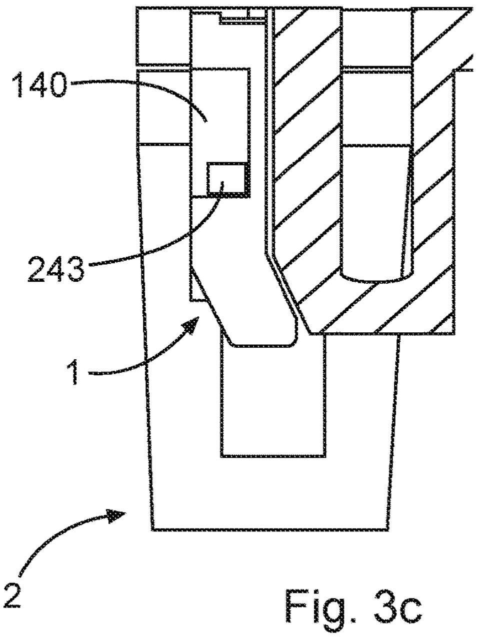
Figure 3D:
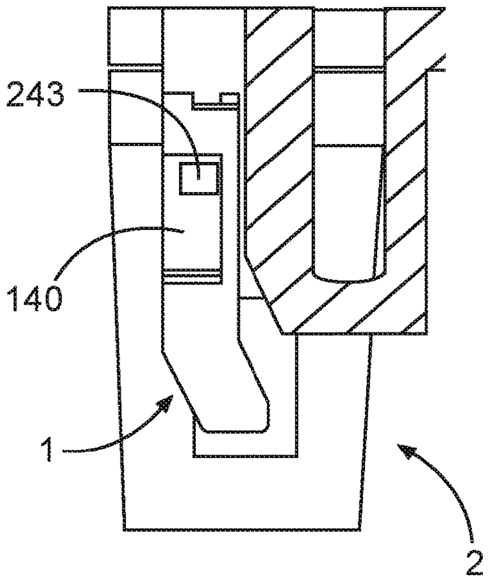

FIGS. 3*a* and 3*c* show the arrangement from FIG. 2*b* in section with the actuator 1 in the non-actuated state, from two different viewing directions. FIGS. 3*b* and 3*d* show the actuator 1 in the actuated state from the two different viewing directions.

In the non-actuated state (FIGS. 3*a* and 3*c*), the application face 10 of the actuator 1 terminates approximately with the base face 21 of the retaining plate 2 and in any case does not protrude beyond it, in order to prevent any inadvertent actuation. In this diagram, the actuator 1 is arranged countersunk in the contact carrier 4.

In the actuated state (FIGS. 3*b* and 3*d*), the upper end of the snap-in recess 140 does not yet butt against the snap-in hook 243. The actuator 1 can therefore change from its non-actuated state to its actuated state and vice versa without a snap-fit or detachment by the assembly catch taking place. The above-described assembly catch plays no role in the actuation but is used exclusively to facilitate assembly, as the name suggests.

FIG. 4*a* shows the contact unit 3. FIGS. 4*b* and 4*c* show how the contact unit 3 is inserted into a contact chamber 40 of a contact carrier 4.

The contact unit 3 has a conductor bar that has a peripheral cage 34. The latter is formed by a punched and bent sheet metal part that is bent at right angles multiple times and closed at its ends. On the cable connection side, the cage 34 is open for the insertion of an electrical conductor, for example a wire of an electrical cable, and the actuation section 12 of the actuator 1.

Partially arranged in the interior of this cage 34 there is a separate, substantially V-shaped clamping spring 31, which consists of resilient sheet steel. The clamping spring 31 has a spring bend 313, which protrudes from the cage 34 on the cable connection side.

The clamping spring 31 also has a retaining limb 311 and a clamping limb 312, which are connected to one another via the curved spring bend 313. The retaining limb 311 is fastened inside the cage 34, that is, from the inside, to a first cage wall 341.

The clamping limb 312 of the clamping spring 31 presses from the inside against a second cage wall 342 opposite the first cage wall 341.

An electrical conductor, for example the wire of an electrical cable (not shown in the drawing) can then be inserted into the cage 34 from the cable connection side direction (that is, coming from above in the drawing) and clamped between the clamping limb 312, which pivots in the plug-in side direction as a result, and the second cage wall 342 in order to be connected to the contact unit 3, i.e., electrically conductively connected thereto and mechanically fixed thereon, at least in a movement direction toward the cable connection side. The electrical conductor, for example the cable, is then secured against being pulled out and is at the same time electrically connected.

The conductor bar 30 has a connection section 35 on the plug-in side. Said connection section consists in a section of the metal sheet angled at right angles to the plug-in direction and has a through-hole to which a plug contact 32 is riveted. The plug contact 32 shown here is a socket contact. It can of course also be a pin contact in another embodiment.

FIG. 4*b* shows the contact unit 3 to be inserted and the contact carrier 4 before the process of insertion, i.e., before the contact carrier 4 is fitted with the contact unit 3 or contact units 3.

The contact carrier 4 is formed integrally and has a connection region 41 with the contact chambers 40 on the cable connection side and a plug-in region 42 on the plug-in side.

The connection region 41 is substantially cuboid and has two short side faces 412 and two wide side faces 411. Snap-in hooks 43 for fastening the retaining plate 2 are molded on the two wide side faces 411. A snap-in nose 44, 44' for fastening in a plug connector modular rack is molded on each of the two short side faces. The two snap-in noses 44, 44' differ from one another in width in order to ensure the correct polarization of a plug connector insert 5, described in more detail below, in the plug connector modular rack.

FIG. 4*c* shows the contact carrier 3 in a transparent representation with multiple contact units 3, which are each inserted into a contact chamber 40 of the contact carrier 4. The contact chambers 40, in which the conductor bar 30 of the contact unit 3 is arranged, are situated in the connection region 41. The plug-in region 42 has through-openings 420, which run in the plug-in direction, are connected to the respective contact chamber 40 and are used to accommodate the plug contact 32 of the contact unit 3.

FIG. 5*a* shows a plug connector insert 5 in the preassembled state. Actuators 1 as described above are preassembled on the retaining plate 2. Furthermore, the retaining plate 2 has four snap-in hooks 23, each having a snap-in window for snap-fitting on the snap-in hooks 43 of the contact carrier 4.

FIG. 5*b* shows a cross section of a detail on the cable connection side of the plug connector insert 5, having a contact carrier device 6 with the connection region 41 of the contact carrier 4, the retaining plate 2 and the actuator 1. Furthermore, the conductor bar 30 of the contact unit 3 together with the clamping spring 31 retained therein is accommodated in the contact carrier device 6. The conductor bar 30 is arranged in the contact chamber 40 of the contact carrier 4. The clamping spring 31 presses with its clamping limb 312 against the second cage wall 342 of the conductor bar 30. An electrical conductor inserted on the cable connection side (from above in the drawing) into the contact carrier device 6 through the connection opening 210 in the retaining plate 2 is clamped between the clamping limb 312 and the second cage wall 342 and electrically contacts the second cage wall 342. As a result, the conductor bar 30 and the plug contact 32 connected thereto are connected electrically conductively to the electrical conductor, for example the wire of the electrical cable. The electrical conductor is secured by the clamping against being pulled out in the cable connection side direction (upward in the drawing).

The actuator 1 can then be pressed with a tool, for example a slot screwdriver, through the actuation opening 211 in the retaining plate 2 in the plug-in direction, that is, downward in the drawing. As a result of the actuation of the actuator 1, that is, the displacement thereof in the plug-in direction, it presses with its bar 123 on the clamping limb 312 of the clamping spring 31, so that said clamping limb pivots in the plug-in direction. As a result, the electrical conductor, for example the wire of the electrical cable, is released and can then be removed on the cable connection side, that is, pulled out upward in the drawing. The actuator 1 is thus used to disconnect the electrical conductor from the contact unit 3.

Even though various aspects or features of the invention are each shown in combination in the figures, it is apparent to a person skilled in the art—unless otherwise indicated—that the combinations shown and discussed are not the only possible ones. In particular, corresponding units or feature combinations from different exemplary embodiments may be interchanged with each other.

LIST OF REFERENCE SIGNS

1 Actuator
10 Application face
12 Actuation section
122 Actuation arms 123 Bar
14 Retaining section
140 Snap-in recess
141 Fixing strip
2 Retaining plate
21 Baseplate
210 Connection opening
211 Actuation opening
23 Snap-in tabs
24 Guide strips
243 Snap-in molding
3 Contact unit
30 Conductor bar
31 Clamping spring
311 Retaining limb
312 Clamping limb
313 Spring bend
32 Plug contact
34 Cage
341 First cage wall
342 Second cage wall
35 Connection section
4 Contact carrier
40 Contact chamber
41 Connection region
411 Wide side faces
412 Short side faces
42 Plug-in region
420 Through-openings
43 Snap-in hook
44, 44' Snap-in noses
5 Plug connector insert
6 Contact carrier device

The invention claimed is:

1. A plug connector insert having a contact carrier device and a contact unit inserted therein with a conductor bar, a clamping spring and a plug contact, wherein the contact carrier device has a contact carrier with a cable connection side, a connection region on the cable connection side, and at least one contact chamber that is open on the cable connection side for accommodating a contact unit, and furthermore has a retaining plate configured for connection and fitting on the contact carrier on the cable connection side, wherein the retaining plate has, for each contact chamber, an actuation opening and a connection opening adjacent thereto for inserting an electrical conductor into the contact chamber, wherein the contact carrier device has, at each actuation opening, an actuator, which is arranged or configured to be arranged at least partially in the corresponding contact chamber for disconnecting the electrical conductor from the contact unit, wherein the conductor bar with the clamping spring is arranged in the contact chamber, and wherein the contact carrier has, on the plug-in side of the connection region, a plug-in region, in which there is, for each contact chamber, a through-opening that is connected thereto and in which the respective plug contact is accommodated, wherein the retaining plate and the at least one actuator have a common assembly catch for preassembling the actuator on the retaining plate.

2. The plug connector insert as claimed in claim 1, wherein the actuator can is configured to be transferred from a non-actuated position to an actuated position in order to disconnect the electrical conductor without a snap-fit or detachment of the assembly catch taking place as a result.

3. The plug connector insert as claimed in claim 1, wherein the assembly catch comprises at least one lateral snap-in recess in the actuator on one side and at least one snap-in molding, which is configured to be accommodated form-fittingly in the snap-in recess, on the retaining plate on the other side.

4. The plug connector insert as claimed in claim 3, wherein the retaining plate has a baseplate in which the connection openings and the actuation openings are arranged, wherein the retaining plate also has, at each actuation opening, two mutually opposing parallel guide strips, which run in the plug-in side direction and on the inside of which the snap-in moldings are arranged.

5. The plug connector insert as claimed in claim 1, wherein the actuator is arranged countersunk in the contact carrier or at least terminates flush with the retaining plate when in the assembled state.

6. The plug connector insert as claimed in claim 1, wherein the connection region of the contact carrier is substantially cuboid and thus has two mutually opposing short side faces and, at right angles thereto, two mutually opposing wide side faces, wherein the contact carrier has a snap-in nose on each of the two short side faces for fixing in a plug connector modular rack.

7. The plug connector insert as claimed in claim 6, wherein the two snap-in noses differ from one another in shape in order to ensure correct polarization of the plug connector insert in the plug connector modular rack.

8. A method for the assembly of a plug connector insert as claimed in claim 1, having the following steps:

A. inserting the contact unit into the contact carrier from the cable connection side direction, and
joining the at least one actuator to the retaining plate from the plug-in side direction, and snap-fitting the at least one actuator on the retaining plate by the assembly catch; and B. joining the retaining plate to the contact carrier and at the same time inserting the at least one actuator into the at least one contact chamber of the contact carrier.

9. The method as claimed in claim 8, wherein the method also has the following step:

C. fastening the retaining plate to the contact carrier.

10. The plug connector insert as claimed in claim 2, wherein the assembly catch comprises at least one lateral snap-in recess in the actuator on one side and at least one snap-in molding, which is configured to be accommodated form-fittingly in the snap-in recess, on the retaining plate on the other side.

11. The plug connector insert as claimed in claim 10, wherein the retaining plate has a baseplate in which the connection openings and the actuation openings are arranged, wherein the retaining plate also has, at each actuation opening, two mutually opposing parallel guide strips, which run in the plug-in side direction and on the inside of which the snap-in moldings are arranged.

12. The plug connector insert as claimed in claim 2, wherein the actuator is arranged countersunk in the contact carrier or at least terminates flush with the retaining plate when in the assembled state.

13. The plug connector insert as claimed in claim 2, wherein the connection region of the contact carrier is substantially cuboid and thus has two mutually opposing short side faces and, at right angles thereto, two mutually opposing wide side faces, wherein the contact carrier has a snap-in nose on each of the two short side faces for fixing in a plug connector modular rack.

14. The plug connector insert as claimed in claim 13, wherein the two snap-in noses differ from one another in shape in order to ensure correct polarization of the plug connector insert in the plug connector modular rack.

15. The plug connector insert as claimed in claim 3, wherein the actuator is arranged countersunk in the contact carrier or at least terminates flush with the retaining plate when in the assembled state.

16. The plug connector insert as claimed in claim 3, wherein the connection region of the contact carrier is substantially cuboid and thus has two mutually opposing short side faces and, at right angles thereto, two mutually opposing wide side faces, wherein the contact carrier has a snap-in nose on each of the two short side faces for fixing in a plug connector modular rack.

17. The plug connector insert as claimed in claim 16, wherein the two snap-in noses differ from one another in shape in order to ensure correct polarization of the plug connector insert in the plug connector modular rack.

18. The plug connector insert as claimed in claim 4, wherein the actuator is arranged countersunk in the contact carrier or at least terminates flush with the retaining plate when in the assembled state.

19. The plug connector insert as claimed in claim 4, wherein the connection region of the contact carrier is substantially cuboid and thus has two mutually opposing short side faces and, at right angles thereto, two mutually opposing wide side faces, wherein the contact carrier has a snap-in nose on each of the two short side faces for fixing in a plug connector modular rack.

20. The plug connector insert as claimed in claim 19, wherein the connection region of the contact carrier is substantially cuboid and thus has two mutually opposing short side faces and, at right angles thereto, two mutually opposing wide side faces, wherein the contact carrier has a snap-in nose on each of the two short side faces for fixing in a plug connector modular rack.

* * * * *